Sept. 27, 1949.    R. L. CUMMEROW ET AL    2,483,125
PHASE SHIFTING POTENTIOMETER Filed June 13, 1946    2 Sheets-Sheet 1

*INVENTOR.*
ROBERT L. CUMMEROW
LINCOLN K. DAVIS
By M. O. Hayes
*Attorney*

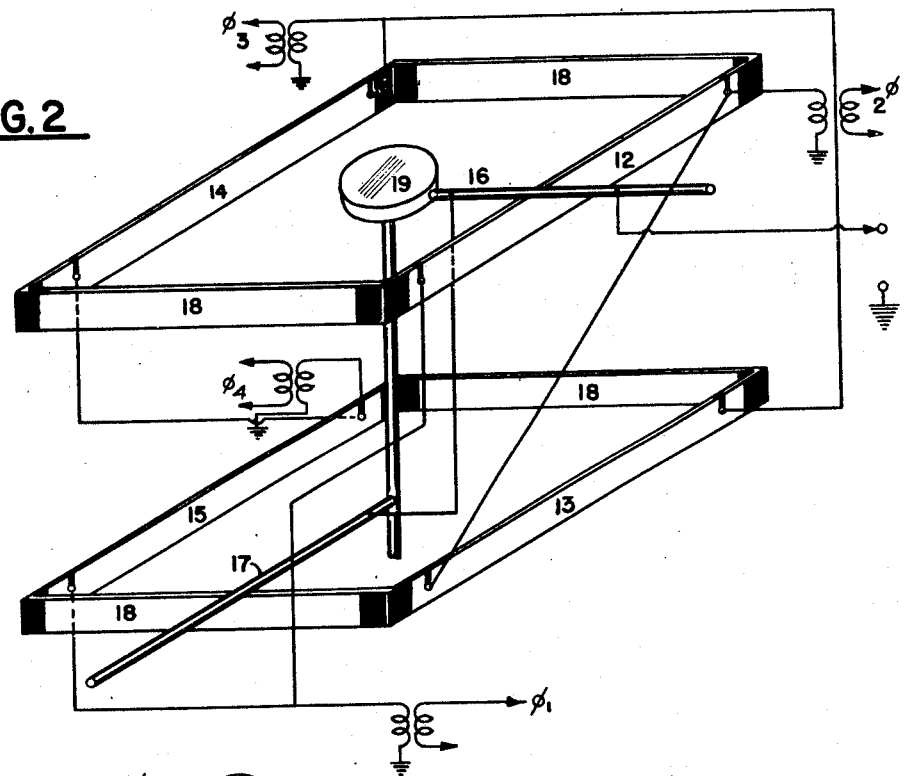
FIG. 2
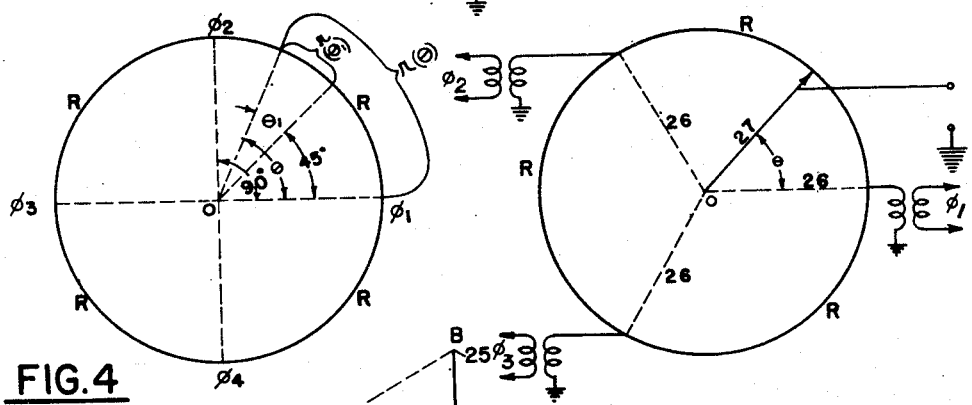
FIG. 4
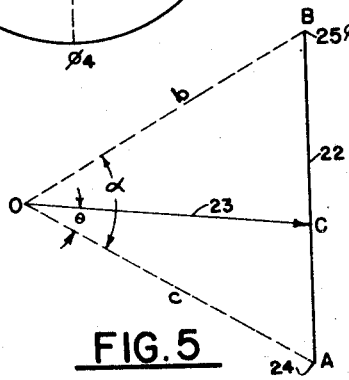
FIG. 5
FIG. 3
INVENTOR.
ROBERT L. CUMMEROW
LINCOLN K. DAVIS
By M. A. Hayes
Attorney Patented Sept. 27, 1949

2,483,125

UNITED STATES PATENT OFFICE 2,483,125

PHASE SHIFTING POTENTIOMETER

Robert L. Cummerow, New London, Conn., and Lincoln K. Davis, Brockton, Mass., assignors to the United States of America as represented by the Secretary of the Navy Application June 13, 1946, Serial No. 676,402

1 Claim. (Cl. 323—121)

Our invention relates to means for measuring the phase shift in an unknown electrical network.

In accordance with our invention, the phase shift in an unknown electrical network is measured with a high degree of accuracy over a wide range of frequencies.

Further in accordance with our invention, means are provided to readily calibrate the system and to vary the phase of an applied signal voltage continuously over a range from 0°–360°.

Our invention further resides in systems having features hereinafter described and claimed.

For an understanding of our invention and for illustration of examples thereof, reference is made to the accompanying drawings, in which:

Figure 2 is a perspective view of the four-phase potentiometer.

Figures 3, 4, and 5 are geometric figures used in explaining the invention.

Figure 1:
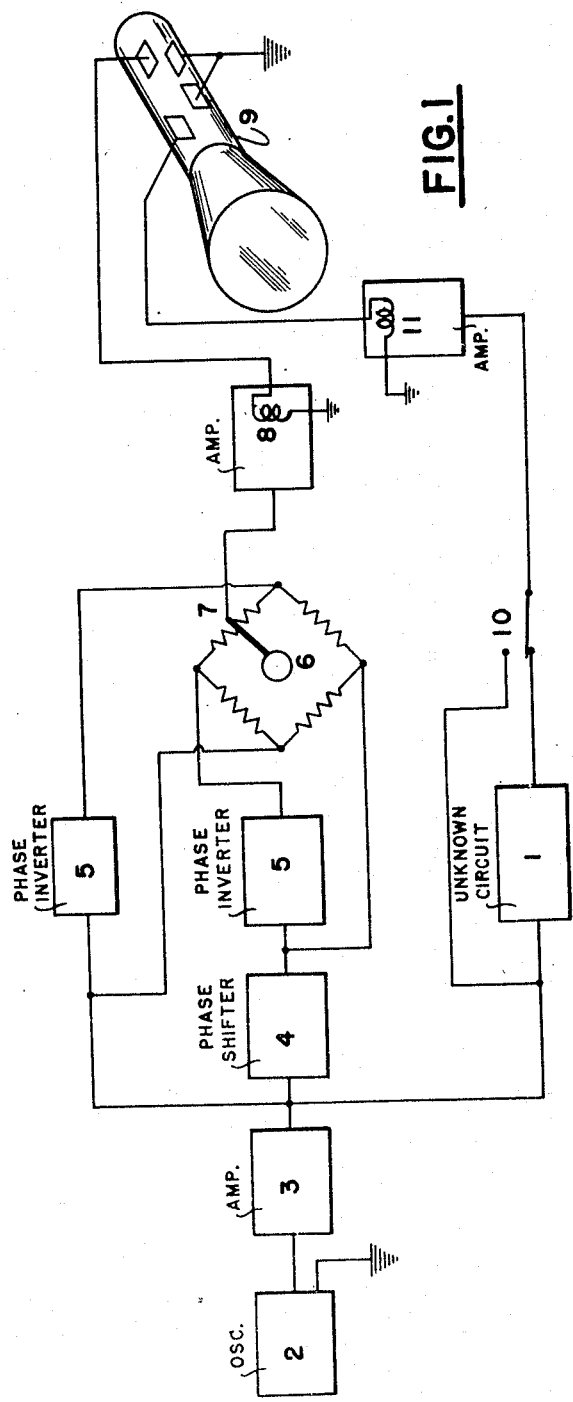
Figure 1 is a block diagram of the phase-measuring system.
Figure 6:
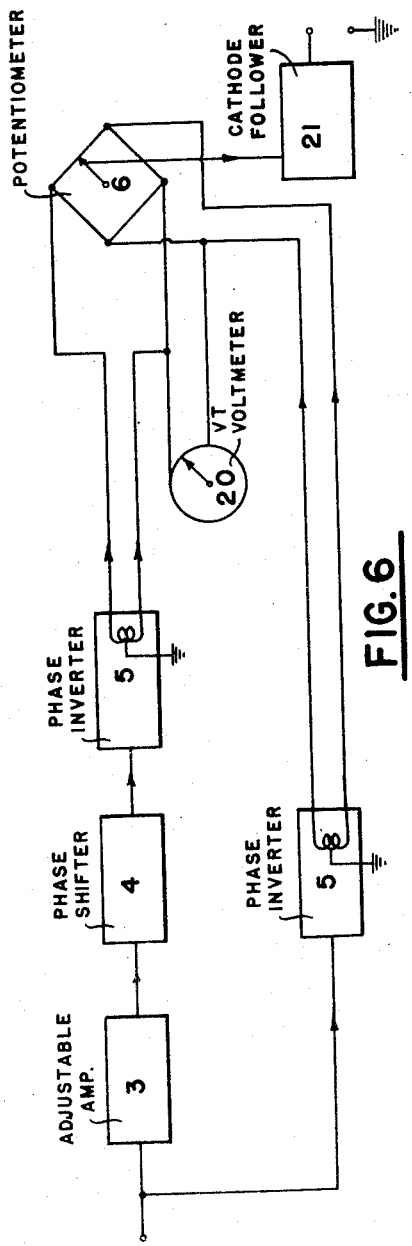

Figure 6 is a block diagram of the components used in the calibration branch of Figure 1.

An electrical voltage from a signal source is passed through a variable phase control circuit and applied to one set of deflecting plates of a cathode ray tube, and the same voltage is also passed through an unknown network and applied to the other set of deflecting plates; the phase control is varied until a phase null results on the cathode ray screen, and the phase shift in the unknown network is read directly off the phase control dial.

Referring to Figure 1, the network may be any device having a phase shift between 0° and 360° from input to output at frequencies within range of the apparatus. As at present designed, the frequency range is from 200 C. P. S. to 60 kc. The measurement apparatus used in determining the phase shift includes a signal source or oscillator 2, the output of which is suitably amplified in an amplifier 3. The amplifier output is taken to two branches of the measurement apparatus as well as to the unknown circuit. One branch of the measurement apparatus includes a 90° phase shifter 4 and a phase inverter 5, each of a type commonly used. The output of the phase inverter and the uninverted quantity are taken to opposite points of a quadrilateral potentiometer 6. As previously noted, a second portion of the output of amplifier 3 is taken through a second branch of the measurement circuit which consists of a phase inverter 5; the output of inverter 5 and the uninverted signal are taken to the remaining 2 corners of the quadrilateral potentiometer 6. The potentiometer output from a slider 7 is taken through a vertical deflection amplifier 8 and impressed on the vertical deflecting means of a cathode ray tube 9. The unknown circuit 1 is taken to the horizontal deflection means through the horizontal amplifier 11 via a two position switch 10. In practice, switch 10 is used to cut out the unknown circuit 1 during balancing and calibration of the system and thereafter restored to the position in which the unknown circuit 1 is included in the circuit. Any phase null indicator may, of course, be substituted for the cathode ray tube, but the accuracy with which this device may be used to indicate phase equality has led to its selection. Another advantage is that this type of indicator is independent of the relative amplitudes of the signals applied to the horizontal and vertical deflecting plates.

The quadrilateral, four-phase potentiometer 6 is shown in Fig. 2 and consists of four similar resistance strips 12—15 disposed in pairs, one above the other and associated with upper and lower slider arms 16, 17 placed at right angles to each other. The resistance strips are separated laterally by strips of material 18 insulated from the resistance strips as shown so that, as the knob is turned which operates the sliders from the position shown in Figure 2, the upper arm 16 moves from resistance strip 12 to the insulated strip 18 at the end, at which time the lower slider 17 contacts resistance strip 13. Continued movement of the knob 19 causes the lower slider to run off resistance strip 13, at which time the upper slider runs onto resistance strip 14. A complete turn of the operating knob will bring the lower slider against resistance strip 15 at the same time that the upper arm is moving away from resistance strip 14. By using two potentiometer arms in different planes with their contact points electrically connected, the practical difficulties encountered in sliding the arm over the corners of a square are avoided, at the same time keeping the variation smooth.

The potentiometer can be used to give a precisely linear variation in phase of the voltage in the slider, if quadrature voltages are applied at each of the four corners. Proof of this statement and a discussion of the development of the potentiometer follows:

In Figure 3 is a potentiometer fed with three voltages 26 of equal amplitude, separated by 120° in time, at 120° intervals around the circumference of the potentiometer. For this type of potentiometer the resistance variation with rotation angle must be:

$$\frac{r(\theta)}{R} = \frac{2 \tan \theta}{\sqrt{3 + 3 \tan \theta}} \quad (1)$$

in order that the change in the mechanical angle of the potentiometer arm 27 be equal to the change in phase angle of the voltage picked off by the arm. In this equation $\theta$ is the mechanical rotation angle as well as the phase angle, R is ⅓ total resistance of the potentiometer and $r(\theta)$ is the resistance from the origin to any angle $\theta$. It didn't seem practical to wind a potentiometer with this type of resistance variation.

Next in Figure 4 a four phase circular potentiometer was tried since it is much easier to obtain four balanced phases over a wide frequency range. The resistance variation is $$\frac{r(\theta)}{r} = \frac{\tan \theta}{\tan \theta + 1} \quad (2)$$

where $r(\theta)$ is the resistance from the origin to any angle $\theta$, and where R is ¼ total resistance of the potentiometer, and $\theta$ is any phase angle. By shifting the origin 45°, the Equation 2 becomes:

$$\frac{r(\theta_1)}{R/2} = \tan \theta_1 \quad (3)$$

This variation is also obtained for a four phase potentiometer if four linear resistance strips are used instead of a linear circular strip. If four balanced phases are fed into the corners of a square configuration of linear resistance strips, the resistance variation with rotation angle is precisely that given by Equation 2.

In Figure 5, if two voltages 24, 25 with a phase difference angle of $\alpha$ between them and amplitudes $e$ and $(b/c)e$ respectively are applied to the ends of a linear resistance strip 22, and a potentiometer arm 23 is centered at O, such that the distance OB and OA are $b$ and $c$ respectively, then the change in the rotation angle of the arm will be equal to the change in the phase angle of the voltage from the contact point of the arm to ground.

Referring to Figure 5, $$\frac{x}{a} = \frac{r(\theta)}{R} = \frac{c \tan \theta}{b \sin \alpha + (c - b \cos \alpha) \tan \theta} \quad (4)$$

where $x$=distance from contact point of arm to A, $a$=total length of resistance strip, R=total resistance of strip, $r(\theta)$ equals resistance between arm's contact point and A, and $\theta$ equals angle between arm and voltage of amplitude $e$.

The normalized voltage to ground of the contact point of the potentiometer is:

$$1 + \left[-1 + \frac{b}{c}(\cos \alpha + j \sin \alpha)\right] \frac{r(\theta)}{R} =$$

$$1 + \left[-1 + \frac{b}{c}(\cos \alpha + j \sin \alpha)\right] \frac{c \tan \theta}{b \sin \alpha + (c - b \cos \alpha) \tan \theta} = \frac{b \sin \alpha (1 + j \tan \theta)}{b \sin \alpha + (c - b \cos \alpha) \tan \theta} \quad (5)$$

Taking the ratio of the imaginary part of (5) to the real part of (5) we obtain an expression for the tangent of the electrical phase angle:

$$\tan \phi = \tan \theta$$
$$\phi = \theta$$

The equality of the rotational angle and the electrical phase angle will be preserved as long as the geometrical configuration of the potentiometer is similar to the time configuration of the voltages applied to the ends of the linear resistance strip.

A description of the calibration of the system follows:

In Figure 6 a block diagram of the components needed to feed the potentiometer is shown. Both channels are designed to have about unity gain. The input signal should be about one volt, but may be as high as 2.5 volts, or as low as is convenient with regard to signal to noise ratio in any particular measuring set up. A gain control 3 is placed in the channel containing the 90° phase shifter 4 so that the voltages fed to the potentiometer 6 can be made equal. A vacuum tube voltmeter 20 which reads the difference between the voltage amplitudes from the two channels is provided so that when the amplitudes are equal, a null reading is obtained. Phase inverters 5 in each channel split the two phases so that four phases balanced to ground are obtained and fed into the potentiometer at the four corners of the square. The voltage output from the arm 7 of the potentiometer is fed into a cathode follower 21 and thence out to a phase null indicator such as a scope.

After the operating frequency has been set on the oscillator, the 90° phase shifter has been set on the correct frequency range, and the gain of the two channels has been equalized, the gains of the external amplifiers can be adjusted to obtain a convenient size oscilloscope pattern. Then, while the same signal is fed into both sides of the oscilloscope (one signal via the phase shifting potentiometer), the zero on the phase shifting potentiometer may be changed until a zero phase indication is obtained on the oscilloscope; this will appear as a 45° straight line running from lower left to upper right. The circuit can then be changed to include the element whose phase angle is to be measured and the phase shifting potentiometer adjusted until a null is obtained. The unknown phase shift is then read directly from the dial of the potentiometer which is graduated down to divisions of ½ degree. This zero adjustment is made possible by a special knob arrangement which permits the rotation of the potentiometer arm with respect to the dial. After the zero adjustment is made, the arm and dial are clamped together and rotate as a unit when actual phase determinations are being made. As long as the operating frequency is not altered and the gain controls of the external amplifiers are not disturbed, this zero adjustment need not be repeated.

What is claimed is:

A four-phase potentiometer, comprising two squares of alternate resistance strips and insulating strips with said squares positioned in superimposing and matching relation, a shaft mounted centrally of said squares, a sliding arm for each square with said sliding arms mounted on said shaft at right angles to each other whereby only one of said sliding arms is on a corner of a square at any setting of said shaft, and connecting means between said resistance strips and between said sliding arms.

ROBERT L. CUMMEROW.
LINCOLN K. DAVIS.

REFERENCES CITED

The following references are of record in the file of this patent:

UNITED STATES PATENTS

| Number | Name | Date |
|---|---|---|
| 1,402,096 | Schneider | Jan. 3, 1922 |
| 1,768,262 | Marrison | June 24, 1930 |
| 1,911,051 | Bedford | May 23, 1933 |
| 2,012,480 | Reich | Aug. 27, 1935 |
| 2,229,450 | Garman | Jan. 21, 1941 |
| 2,396,244 | Borsum | Mar. 12, 1946 |
| 2,411,423 | Guptill | Nov. 18, 1946 |

FOREIGN PATENTS

| Number | Country | Date |
|---|---|---|
| 451,786 | Great Britain | Aug. 12, 1936 |